March 10, 1959     A. P. GLENNY     2,876,967
CONTROL SYSTEMS FOR AIRCRAFT
Filed Oct. 1, 1953
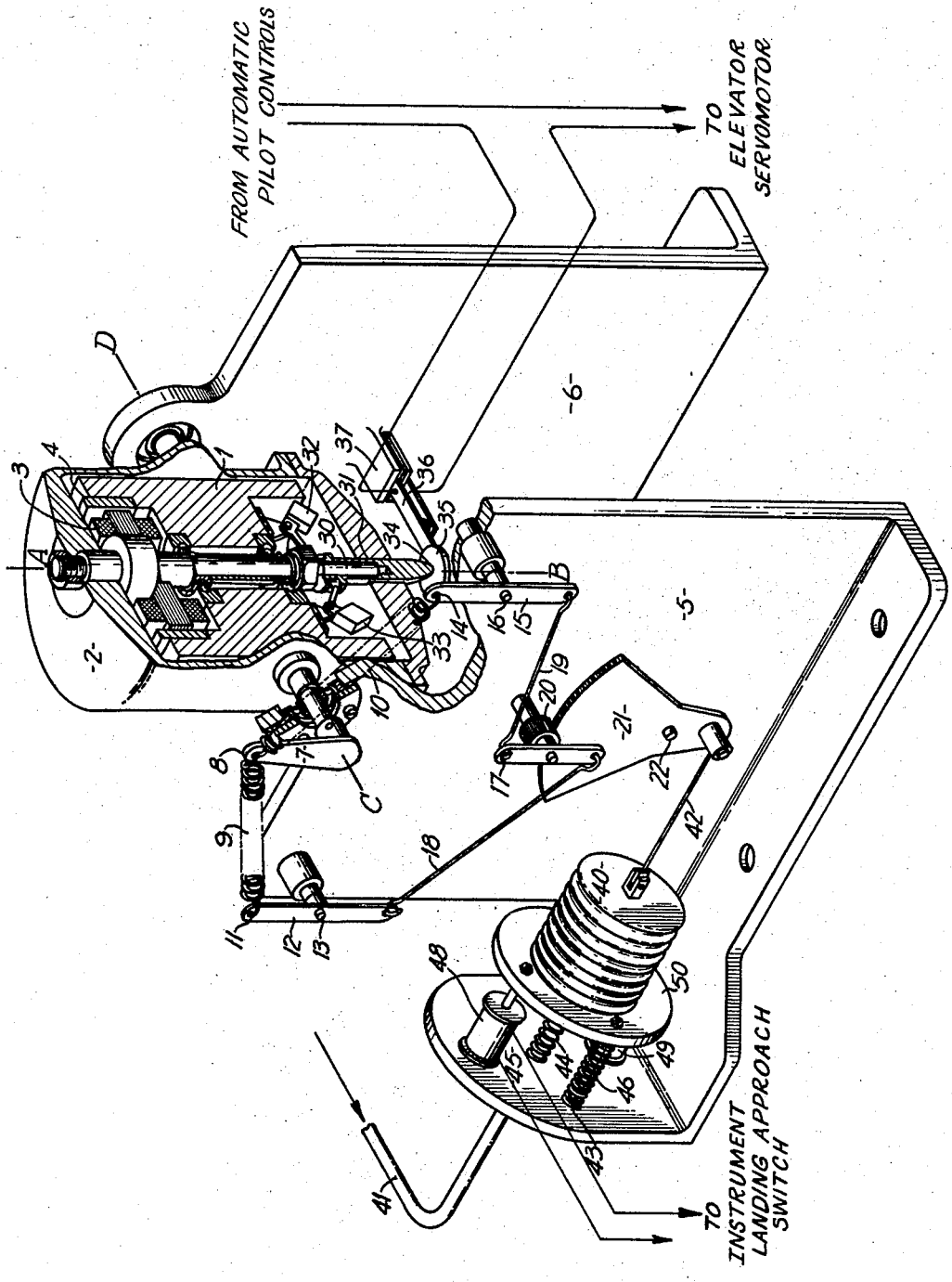
INVENTOR
ARTHUR P. GLENNY
BY
Herbert H. Thompson
his ATTORNEY.

though the performance of the system to
2,876,967

CONTROL SYSTEMS FOR AIRCRAFT

Arthur Philip Glenny, Castle Way, Hanworth, England, assignor to The Sperry Gyroscope Company Limited, Brentford, England, a British company Application October 1, 1953, Serial No. 383,540

Claims priority, application Great Britain October 2, 1952

8 Claims. (Cl. 244—77)

This invention relates to control systems for aircraft and in particular to a safety device for use in conjunction with such systems. The safety device is useful in any aircraft equipped with means for operating the control surface or surfaces that control the craft about a particular axis in the craft in dependence on signals measuring the difference between a set angle and the actual angle that a reference line in the craft makes about that axis with a reference direction defined by gyroscopic apparatus. It is of particular value in aircraft equipment with automatic means for operating the control surface or surfaces in the above manner and the invention will accordingly be described as applied to such systems. In automatic control systems for aircraft it is usual to provide means for controlling the craft about three axes, so that it automatically acquires and maintains a set angle of bank, a set angle of climb and a set direction in azimuth.

In the interests of safety, it is essential that any automatic control system (1) should in no circumstances apply loads to the aircraft beyond its safe stress limits and (2) should not at any time put the aircraft into a dangerous attitude. It is possible to prevent an automatic control system from applying dangerous loads to the aircraft by limiting the power of the servo systems that operate the various control surfaces. Such limitation, however, causes the performance of the system to be very poor and may even make it unstable. Similarly, it would be possible to prevent the control system from causing the aircraft to assume a dangerous attitude by restricting the range of control over which the system is capable of operating each control surface, but again such limitation could only be achieved at the expense of performance and stability.

The object of the present invention is to provide a safety device which operates to disable the automatic control system and allow the pilot to take over control of the craft whenever the load applied to the craft exceeds a predetermined value or the craft changes its attitude at such a rate that if the change were allowed to continue the craft would assume a dangerous attitude.

It has previously been proposed to provide arrangements for disconnecting an automatic control system from the control surface or surfaces of an aircraft in the event of the inclination of the aircraft with reference to gyroscopic apparatus attaining an excessive value. In particular in Patent No. 2,280,116 to B. G. Carlson, dated April 21, 1942, there is described and claimed automatic control means for aircraft comprising gyroscopic apparatus operative under normal conditions of flight of the aircraft to exercise control on a control surface or surfaces of the aircraft in dependence on the inclination of the aircraft relative to the gyroscopic apparatus and means responsive to an excessive value of said inclination for interrupting the said normal control of the control surface or surfaces in dependence on said inclination. Similarly, various systems have been proposed for preventing the control system from applying excessive loads to the aircraft, such systems taking the form of a strain gauge in the operating mechanism for each control surface designed to disconnect the automatic control system when the force being applied to that control surface exceeds a safe limit.

The present invention is based on the principle that the assumption by the aircraft of a dangerous attitude is the result of abnormal rates of change of its inclination about its pitch or its roll axis or in azimuth. The assumption of a dangerous attitude may therefore be anticipated by means of angular accelerometers or rate gyroscopes arranged to detect rates of change of the pitch angle, the roll angle and the azimuth heading of the craft. As the most dangerous attitudes are those associated with excessive rates of change about the pitch and roll axes, it is sufficient in many installations to provide accelerometers for measuring rates of change about these axes.

A particular aspect of the present invention is based on the principle that the aerodynamic load on a control surface of a craft, and hence the load on the craft caused by the operation of that control surface depends on the product of the velocity of the craft and the rate of change of the attitude of the craft about the axis about which that control surface exercises control. Thus the load on the main lift surfaces of the elevator is proportional to $V\dot{\theta}$, where V is the velocity of the craft and $\dot{\theta}$ is the rate of change of pitch attitude. Similarly, the load on the aileron control surfaces may be shown to be proportional to the product of the velocity of the craft and the rate of change of roll attitude. It will be understood that for a given airspeed, the rate of change of roll attitude and pitch attitude is proportional to the angular deflections of the ailerons and elevators, respectively.

The invention consists in a safety device for an aircraft equipped with means for operating the control surface or surfaces that control the craft about a particular axis in the craft in dependence on signals measuring the difference between a set angle and the actual angle that a reference line in the craft makes about that axis with a reference direction defined by gyroscopic apparatus, comprising means for inhibiting the control of the surface or surfaces in dependence on the said difference whenever the rate of change of the actual angle exceeds a set rate of change.

In accordance with the particular aspect of the invention, the value of the set rate of change is varied in dependence on the speed of the craft and is preferably made proportional thereto. In this way a safety device is realised that fulfills the two safety requirements referred to above, since it prevents the control system from putting the aircraft into a dangerous attitude by detecting excessive rates of change of the attitude of the craft, and it also prevents the control system from loading the aircraft beyond its safe stress limits by varying the rate of change of attitude at which the disabling means operates in dependence on the speed of the craft.

Under certain flight conditions, e. g. when the aircraft is about to land, craft attitudes which would normally be safe are liable to be dangerous. Therefore in a particular form of the invention the value of the set rate of change is reduced under these conditions so that the control means is disabled at a lower rate of change of attitude than under normal flight conditions.

The invention also consists in automatic control apparatus for aircraft which is automatically disabled whenever the rate of pitch of the aircraft exceeds a set rate of pitch or the rate of roll of the aircraft exceeds a set rate of roll.

The invention also consists in a safety device for an aircraft equipped with an automatic control system comprising a rate gyroscope having a rotor case mounted with angular freedom of movement about its precession axis but constrained to return to a central or reference position relative to the craft about that axis by means of tension springs that are adjustable in dependence on the air speed of the craft, and a switch mechanism which is opened whenever the rotor case is rotated about its precession axis relative to the craft by more than a predetermined angle from its central or reference position.

One embodiment of the invention will now be described with reference to the accompanying drawing.

In this particular embodiment two rate gyroscopes are used, one being responsive to pitch of the aircraft and the other being responsive to roll. Each rate gyroscope is arranged so that its spin axis is normally substantially vertical when the aircraft is in straight and level flight, and the roll gyroscope is mounted with freedom of angular movement about the pitch axis of the aircraft while the pitch gyroscope is mounted with angular freedom of movement about the roll axis.

The drawing shows an isometric projection partly in section of the pitch gyroscope and it is to be understood that the system includes a second similar gyroscope mounted with angular freedom about an axis perpendicular to that about which the gyroscope shown has angular freedom of movement.

The pitch gyroscope comprises a rotor 1 arranged for spinning about an axis AB in a rotor case 2. The rotor is driven by an electric motor comprising a stator winding 3 and a squirrel-cage rotor winding 4. The stator winding 3 is supplied with three-phase alternating current by means of leads and slip rings not shown. The rotor case 2 is mounted with freedom of angular movement about an axis CD in a pair of supports 5 and 6 mounted in the aircraft, so that the axis CD coincides with, or is parallel to, the fore-and-aft axis of the aircraft. A lever arm 7 is fixed to one end of the pivot that supports the rotor case 2 for rotation about the axis CD, so that it rotates with the rotor case. The rotor case is constrained by means of springs 9 and 10 to remain in a central or reference position in relation to the aircraft, in which position the spin axis AB is substantially vertical when the aircraft is in straight and level flight. One end of each spring is secured in a hole 8 in the lever arm 7. The other end of spring 9 is secured in a hole 11 in a lever 12 pivoted for rotation about its centre point by means of a pivot 13 located in the support 5. Similarly the other end of spring 10 is secured in a hole 14 in a lever arm 15 pivoted for rotation about its centre point by means of a pivot 16 located in the support 5. The levers 12 and 15 are connected to a further lever 17 by means of links 18 and 19, the lever 17 being pivoted about its centre point by means of a pivot located in the support 5 and carrying a pinion 20 constrained to rotate with the lever. The pinion 20 meshes with a quadrant 21 pivoted about an axis 22 located in the support 5. It may be seen that this arrangement causes the tension in the springs 9 and 10 to be increased when the quadrant 21 is rotated in a clockwise direction and similarly that the tension in springs 9 and 10 is reduced if the quadrant is turned in an anticlockwise direction.

In accordance with well-known gyroscopic principles, if the platform or vehicle on which the supports 5 and 6 are carried is rotated about an axis normal to both axes AB and CD, or is given a rotation that has a component normal to both axes AB and CD, the rotor case 2 will precess about the axis CD through an angle that depends on the rate of rotation about the axis normal to axes AB and CD and upon the tension in the springs 9 and 10. Thus, assuming that the axis CD corresponds to the fore-and-aft axis of the craft the rate of pitch at which the rotor case 2 will be rotated about the axis CD with reference to the supports 5 and 6 through a predetermined angle may be varied in dependence on the angular position of the quadrant 21 about its pivot axis 22.

On the lower end of the gyroscope rotor shaft an extension 30 is provided on which a sleeve 31 is arranged to slide along the axis AB. The position of the sleeve along this axis is controlled by a centrifugal governor comprising weights 32 and 33 in such a way that it descends when the gyroscope rotor is running and ascends when the gyroscope rotor is stationary. When the gyroscope rotor is running normally and the rotor case is in its central or reference position, a ball-end 34 carried on the sleeve 31 is arranged to press on a pad 35 which controls a leaf spring 36 forming part of a switch 37. This switch is connected in the main supply to the automatic control system of the aircraft and is arranged so that when it is open the automatic control system is disconnected from the control surfaces of the craft and control reverts to the pilot. Deflection of the rotor case from the central position about the axis CD, as a result of a predetermined rate of pitch causes the ball-end 34 to run off a spring pad 35 and allows the switch to open so that the automatic control system is disabled. Similarly, if the rotor 1 of the gyroscope should cease to rotate or should slow down as a result of a fault, the sleeve 31 rises on the extension of the rotor shaft 30 and the switch is opened. As previously mentioned, if the load on the aircraft produced by operation of the elevator is not to exceed a certain limiting value, the value of the rate of pitch $\theta$ at which the cut-out switch operates must be made inversely proportional to the velocity V. This condition is achieved by making the tension in the springs 9 and 10 inversely proportional to the speed of the craft.

For this purpose the quadrant 21 is arranged to be controlled by a bellows 40 supplied from the air-speed indicating system by means of a pipe 41. One end of the bellows sylphon is connected by means of a shaft 42 to the quadrant 21. The bellows sylphon is designed as a spring whose extension is substantially proportional to the pressure in the Pitot tube, i. e. to air speed, and the linkage is arranged to produce the desired proportionality.

To enable the rate of pitch at which the cut-out switch operates to vary under approach conditions, the end-plate 50 of the bellows 40 is slidably mounted in such a way that it may be moved along the axis of the shaft 42. To this end it is carried on a pair of pillars 43 and 44 fixed in a bracket 45 on the support 5. Springs 46 and 47 urge the end-plate 50 away from the bracket 45. Solenoids 48 and 49 fixed in the bracket 45, operate to pull the end-plate 50 towards the bracket 45 against the action of the springs 46 and 47, when they are energized. These solenoids are normally energized and in the normal operating position the end-plate 50 is pulled as far as possible towards the bracket 45. The solenoids are connected in such a way that they are de-energised when the pilot operates the switch that couples the automatic control system to the instrument landing system, with the result that the bellows 40 moves away from the bracket 45 and so causes the quadrant 21 to be rotated in an anticlockwise direction and the tension in the springs 9 and 10 to be decreased. Thus the deflection of the rotor case 2 from its central position becomes large enough to open the cut-out switch 37 at a lower rate of pitch than when the solenoids are energised. The solenoids 48 and 49 provide a normally ineffective means for conditioning the airspeed spring adjusting means to decrease the tension of the centralizing springs by a predetermined extent. The means for rendering the conditioning effective is constituted by the springs 46 and the circuitry supplying energy to the solenoids 48 and 49 which cooperate in an approach landing condition of the automatic pilot to move the end plate 50 of the airspeed spring adjusting means.

The switch of the roll gyroscope is connected in series with the switch 37 so that the device operates to disable the automatic control system whenever the rate of pitch or the rate of roll of the aircraft exceeds the safe value for the air speed. This rate is higher than the maximum required for normal manoeuvres. Also during the approach conditions, when the manoeuvring rates are necessarily very limited, the device causes the control system to be disabled at lower rates so that the possible change in attitude is limited.

The device fails safe since, should the rotor of either rate gyroscope slow down or stop, the automatic control system is disabled, as it is also in the event of breakage of any of the control springs or their connections to the rotor case or the bellows.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A safety device for automatic pilots for aircraft comprising switch means for disabling the servomotor operating the control surfaces of the craft governing its turning about a horizontal axis (e. g., the roll or pitch axis), a rate of turn gyroscope responsive to the turn of the craft about such axis, means for varying the response of said gyroscope in accordance with the air speed of the craft, and means operatively connected to the gyroscope for opening said switch means when the response of said gyroscope exceeds a predetermined limit for the speed at which the craft is flying.

2. A safety device for automatic pilots for aircraft comprising switch means for disabling the servomotor operating the control surfaces of the craft governing its turning about a horizontal axis (e. g., the roll or pitch axis), a rate of turn gyroscope responsive to the turn of the craft about such axis, centralizing springs for constraining said gyroscope against said precession, means for adjusting the strength of said springs inversely with air speed, and means responsive to precession of said gyroscope beyond a predetermined limit in either direction for opening said switch means.

3. A safety device for automatic pilots for aircraft as claimed in claim 2, in which the rotor of said rate of turn gyroscope is provided with a centrifugal device, and means operated thereby when the rotor is not operating at full speed for also opening said switch means.

4. A safety device for automatic pilots as claimed in claim 2, including normally ineffective means for conditioning said spring adjusting means to decrease the tension of the centralizing springs by a predetermined extent, and means for rendering said conditioning means effective in an approach landing condition of the automatic pilot.

5. A safety device for aircraft having an automatic pilot with an instrument landing control comprising a rate gyroscope having a rotor case mounted with angular freedom in relation to the craft about a precession axis, springs constraining said rotor case to return to a reference position about its precession axis in relation to the craft, means for adjusting the tension of said springs depending on the air speed of the craft, mechanism for disabling the automatic pilot brought into action by precession of the rotor case about its precession axis through more than a predetermined angle from its reference position in relation to the craft, normally ineffective means operatively connected to said adjustable spring tension means for decreasing the tension of the springs by a predetermined extent, and means dependent upon inclusion of the instrument landing control in the automatic pilot for rendering said spring tension decreasing means effective.

6. A safety device for aircraft having automatic pilot means and normally ineffective means for disabling the automatic pilot means, a rate of turn gyroscope carried by the craft responsive to turns of the craft about an axis, means for varying the response of said turn rate gyroscope in accordance with the speed of the craft in flight, and means operatively connected to said gyroscope for rendering said disabling means effective when the response of the gyroscope exceeds a predetermined value for the speed at which the craft is flying.

7. A safety device as claimed in claim 6 including second means for rendering said automatic pilot disabling means effective when the speed of rotation of the rotor of the gyroscope drops below a predetermined value.

8. A safety device as claimed in claim 6, in which said automatic pilot means includes an instrument landing control, normally ineffective means operatively connected to said response varying means for modifying the operation thereof by a predetermined fixed extent, and means for rendering said normally ineffective modifying means effective when the instrument landing control is operatively included in said automatic pilot means.

References Cited in the file of this patent

UNITED STATES PATENTS

| | | |
|---|---|---|
| 2,659,041 | Kutzler | Nov. 10, 1953 |
| 2,662,207 | Hollister | Dec. 8, 1953 |
| 2,663,001 | Rusler et al. | Dec. 15, 1953 |
| 2,665,086 | Moog et al. | Jan. 5, 1954 |
| 2,674,711 | MacCallum | Apr. 6, 1954 |